(12) United States Patent
Nabar et al.

(10) Patent No.: US 8,428,530 B1
(45) Date of Patent: *Apr. 23, 2013

(54) INCREASING THE ROBUSTNESS OF CHANNEL ESTIMATES DERIVED THROUGH SOUNDING FOR WLAN

(75) Inventors: Rohit U. Nabar, Sunnyvale, CA (US); Hongyuan Zhang, Sunnyvale, CA (US); Arul Durai Murugan Palanivelu, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/346,521

(22) Filed: Jan. 9, 2012

Related U.S. Application Data

(63) Continuation of application No. 12/186,437, filed on Aug. 5, 2008, now Pat. No. 8,095,097.

(60) Provisional application No. 60/954,113, filed on Aug. 6, 2007.

(51) Int. Cl.
*H04B 1/26* (2006.01)
(52) U.S. Cl.
USPC ............ 455/179.1; 455/562.1; 455/526; 375/260; 370/338
(58) Field of Classification Search ............ 455/179.1, 455/562.1, 526, 120, 67.14; 375/260, 267; 370/338, 431, 230
See application file for complete search history.

(56) References Cited

U.S. PATENT DOCUMENTS

| | | | | |
|---|---|---|---|---|
| 5,530,725 A * | 6/1996 | Koch | ............................ | 375/347 |
| 6,002,716 A * | 12/1999 | Meyer et al. | ................... | 375/231 |
| 6,026,130 A * | 2/2000 | Rahmatullah et al. | ........ | 375/340 |
| 6,400,928 B1 * | 6/2002 | Khullar et al. | ............. | 455/67.11 |
| 6,785,513 B1 * | 8/2004 | Sivaprakasam | .............. | 455/63.1 |
| 7,194,042 B2 | 3/2007 | Walton et al. | | |
| 7,324,605 B2 * | 1/2008 | Maltsev et al. | ............... | 375/299 |
| 7,474,641 B2 * | 1/2009 | Kuroda | ......................... | 370/329 |
| 7,646,823 B2 * | 1/2010 | Gaikwad | ....................... | 375/267 |
| 7,684,529 B2 * | 3/2010 | Chimitt et al. | ................ | 375/350 |
| 7,710,925 B2 * | 5/2010 | Poon | ............................ | 370/334 |
| 7,715,876 B2 * | 5/2010 | Nakao | ........................ | 455/562.1 |
| 7,715,878 B2 * | 5/2010 | Nakao | ........................ | 455/562.1 |
| 7,813,442 B2 * | 10/2010 | Gaikwad | ....................... | 375/267 |
| 8,095,097 B1 * | 1/2012 | Nabar et al. | ................ | 455/179.1 |
| 2005/0094741 A1 * | 5/2005 | Kuroda | ......................... | 375/267 |
| 2005/0169399 A1 * | 8/2005 | Magee et al. | ................. | 375/267 |

(Continued)

FOREIGN PATENT DOCUMENTS

WO WO-2007/103085 A2 9/2007

OTHER PUBLICATIONS 802.11 Working Group: "IEEE 802.11 n. Part 11: Wireless LAN Medium Access Control (MAC) and Physical Layer (PHY) specifications: Enhancements for Higher Throughput," *IEEE* Mar. 2006, pp. 119-125.

(Continued)

*Primary Examiner* — Minh D Dao

(57) ABSTRACT

A plurality of training signal sets are transmitted. Each training signal set includes information sufficient to determine a channel estimate corresponding to a communication channel from a first station to a second station. A refined channel estimate is determined based on reception of the plurality of training signal sets.

20 Claims, 7 Drawing Sheets

U.S. PATENT DOCUMENTS

| | | | |
|---|---|---|---|
| 2005/0185728 | A1 | 8/2005 | Wallace et al. |
| 2006/0269023 | A1* | 11/2006 | Chimitt et al. ............. 375/350 |
| 2008/0089396 | A1 | 4/2008 | Zhang et al. |
| 2008/0101495 | A1* | 5/2008 | Gaikwad ................. 375/267 |
| 2009/0059880 | A1* | 3/2009 | Kuroda ................... 370/338 |
| 2010/0238912 | A1* | 9/2010 | Merlin et al. ............. 370/338 |

OTHER PUBLICATIONS

"Information technology—Telecommunications and information exchange between systems—Local and metropolitan area networks—Specific requirements, Part 11: Wireless LAN Medium Access Control (MAC) and Physical Layer (PHY) specifications," ISOIIEC 8802-11, ANSI/IEEE Std. 802.11, 1999.

"Draft Supplement to Standard [for] Information Technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2 GHz Band," IEEE Std. 802.11g/D8.2, Apr. 3, 2003.

"Supplement to IEEE Standard for Information technology—Telecommunications and information exchange between systems—Local and metropOlitan area networks—Specific requirements Part 11: Wireless LAN Medium Access Control (MAC) and Physical Layer (PHY) specifications: High-speed Physical Layer in the 5 GHZ Band," IEEE Std. 802.11 a,1999.

"Supplement to IEEE Standard for Information technology—Telecommunications and information exchange between systems—Local and metropolitan area networks—Specific requirements Part 11: Wireless LAN Medium Access Control (MAC) and PhYSical Layer (PHY) specifications: Higher-speed Physical Layer Extension in the 2A GHZ Band," IEEE Std. 802.11 b, 1999.

IEEE Standard for Local and metropolitan area networks: Part 16: Air Interface for Fixed and Mobile Broadband Wireless Access Systems/Amendment 2: Physical and Medium Access Control Layers for Combined Fixed and Mobile operation in Licensed Bands and Corrigendum 1, IEEE Std. 802.16e and IEEE Std. 802.16 2004/Cor 1-2005, Feb. 28, 2006.

IEEE Standard for Local and metropolitan area networks: Part 16: Air Interface for Fixed Broadband Wireless Access Systems—Amendment 2: Medium Access Control Modifications and Additional Physical Layer Specifications for 2-11 GHz, IEEE Std. 802.16a 2003, Apr. 1, 2003.

S. A. Mujtaba, "IEEE P802.11—Wireless LANS, TGn Sync Proposal Technical Specification," doc.: IEEE 802.11-04/0889r6, May 2005.

* cited by examiner

INCREASING THE ROBUSTNESS OF CHANNEL ESTIMATES DERIVED THROUGH SOUNDING FOR WLAN

CROSS-REFERENCE TO RELATED APPLICATIONS

The present application is a continuation application of U.S. application Ser. No. 12/186,437, now U.S. Pat. No. 8,095,097, entitled "INCREASING ROBUSTNESS OF CHANNEL ESTIMATES DERIVED THROUGH SOUNDING FOR WLAN," filed on Aug. 5, 2008, which claims the benefit of U.S. Provisional Patent Application No. 60/954,113, entitled "Increasing the Robustness of Channel Estimates Derived through Sounding for WLAN," which was filed on Aug. 6, 2007. The disclosures of the above-referenced applications are hereby incorporated by reference herein in their entireties.

FIELD OF TECHNOLOGY

The present disclosure relates generally to wireless communication systems and, more particularly, to a system and method for estimating a channel in a wireless communication system with multiple transmit antennas and/or multiple receive antennas.

DESCRIPTION OF THE RELATED ART

An ever-increasing number of relatively inexpensive, low power wireless data communication services, networks and devices have been made available over the past number of years, promising near wire speed transmission and reliability. Various wireless technologies are described in detail in the 802.11 IEEE Standard, including for example, the IEEE Standard 802.11 (1999) and its updates and amendments, the IEEE Standard 802.11a/g (2003), as well as the IEEE Standard 802.11n now in the process of being adopted, all of which are collectively incorporated herein fully by reference. These standards have been or are in the process of being commercialized with the promise of 54 Mbps or more effective bandwidth, making them a strong competitor to traditional wired Ethernet and the more ubiquitous "802.11b" or "WiFi" 11 Mbps mobile wireless transmission standard.

Generally speaking, transmission systems compliant with the IEEE 802.11a and 802.11g or "802.11a/g" as well as the 802.11n standards achieve their high data transmission rates using Orthogonal Frequency Division Modulation or OFDM encoded symbols mapped up to a 64 quadrature amplitude modulation (QAM) multi-carrier constellation. In a general sense, the use of OFDM divides the overall system bandwidth into a number of frequency sub-bands or channels, with each frequency sub-band being associated with a respective sub-carrier upon which data may be modulated. Thus, each frequency sub-band of the OFDM system may be viewed as an independent transmission channel within which to send data, thereby increasing the overall throughput or transmission rate of the communication system.

Transmitters used in the wireless communication systems that are compliant with the aforementioned 802.11a/802.11g/802.11n standards as well as other standards such as the 802.16a/d/e/m IEEE Standards, typically perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the aforementioned 802.11a/802.11g/802.11n and 802.16a IEEE standards typically include an RF receiving unit that performs RF down-conversion and filtering of the received signals (which may be performed in one or more stages), and a baseband processor unit that processes the OFDM encoded symbols bearing the data of interest. The digital form of each OFDM symbol presented in the frequency domain is recovered after baseband downconversion, conventional analog to digital conversion and Fast Fourier Transformation of the received time domain analog signal. Thereafter, the baseband processor performs frequency domain equalization (FEQ) and demodulation to recover the transmitted symbols, and these symbols are then processed in a Viterbi decoder to estimate or determine the most likely identity of the transmitted symbol. The recovered and recognized stream of symbols is then decoded, which may include deinterleaving and error correction using any of a number of known error correction techniques, to produce a set of recovered signals corresponding to the original signals transmitted by the transmitter.

In wireless communication systems, the RF modulated signals generated by the transmitter may reach a particular receiver via a number of different propagation paths, the characteristics of which typically change over time due to the phenomena of multi-path and fading. Moreover, the characteristics of a propagation channel differ or vary based on the frequency of propagation. To compensate for the time varying, frequency selective nature of the propagation effects, and generally to enhance effective encoding and modulation in a wireless communication system, each receiver of the wireless communication system may periodically develop or collect channel state information (CSI) for each of the frequency channels, such as the channels associated with each of the OFDM sub-bands discussed above. Generally speaking, CSI is information describing one or more characteristics of each of the OFDM channels (for example, the gain, the phase and the SNR of each channel). Upon determining the CSI for one or more channels, the receiver may send this CSI back to the transmitter, which may use the CSI for each channel to pre-condition the signals transmitted using that channel so as to compensate for the varying propagation effects of each of the channels.

An important part of a wireless communication system is therefore the selection of appropriate data rates, and the coding and modulation schemes to be used for a data transmission based on channel conditions. Generally speaking, it is desirable to use the selection process to maximize throughput while meeting certain quality objectives, such as those defined by a desired frame error rate (FER), symbol error rate, latency criteria, etc.

To further increase the number of signals which may be propagated in the communication system and/or to compensate for deleterious effects associated with the various propagation paths, and to thereby improve transmission performance, it is known to use multiple transmit and receive antennas within a wireless transmission system. Such a system is commonly referred to as a multiple-input, multiple-output (MIMO) wireless transmission system and is specifically provided for within the 802.11n IEEE Standard now being adopted. As is known, the use of MIMO technology produces significant increases in spectral efficiency and link reliability, and these benefits generally increase as the number of transmission and receive antennas within the MIMO system increases.

In addition to the frequency channels created by the use of OFDM, a MIMO channel formed by the various transmit and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different SNRs at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

However, instead of using different transmit and receive antennas to form separate spatial channels on which additional information is sent, better reception properties can be obtained in a MIMO system by using each of the various transmit antennas of the MIMO system to transmit the same signal while phasing (and amplifying) this signal as it is provided to the various transmit antennas to achieve beamforming or beamsteering. Generally speaking, beamforming or beamsteering creates a spatial gain pattern having one or more high gain lobes or beams (as compared to the gain obtained by an omni-directional antenna) in one or more particular directions, while reducing the gain over that obtained by an omni-directional antenna in other directions. If the gain pattern is configured to produce a high gain lobe in the direction of each of the receiver antennas, the MIMO system can obtain better reception reliability between a particular transmitter and a particular receiver, over that obtained by single transmitter-antenna/receiver-antenna systems.

There are many known techniques for determining a steering matrix specifying the beamsteering coefficients that need to be used to properly condition the signals being applied to the various transmit antennas so as to produce the desired transmit gain pattern at the transmitter. As is known, these coefficients may specify the gain and phasing of the signals to be provided to the transmit antennas to produce high gain lobes in particular or predetermined directions. These techniques include, for example, transmit-MRC (maximum ratio combining) and singular value decomposition (SVD). An important part of determining the steering matrix is taking into account the specifics of the channel between the transmitter and the receiver, referred to herein as the forward channel. As a result, steering matrixes are typically determined based on the CSI of the forward channel. However, to determine the CSI or other specifics of the forward channel, the transmitter must first send a known test or calibration signal to the receiver, which then computes or determines the specifics of the forward channel (e.g., the CSI for the forward channel) and then sends the CSI or other indications of the forward channel back to the transmitter, thereby requiring signals to be sent both from the transmitter to the receiver and then from the receiver back to the transmitter in order to perform beamforming in the forward channel. Moreover, this exchange must occur each time the forward channel is determined (e.g., each time a steering matrix is to be calculated for the forward channel).

To reduce the amount of startup exchanges required to perform beamforming based on CSI or other channel information, it is known to perform implicit beamforming in a MIMO communication system. With implicit beamforming, the steering matrix is calculated or determined based on the assumption that the forward channel (i.e., the channel from the transmitter to the receiver in which beamforming is to be accomplished) can be estimated from the reverse channel (i.e., the channel from the receiver to the transmitter). In particular, the forward channel can ideally be estimated as the matrix transpose of the reverse channel. Thus, in the ideal case, the transmitter only needs to receive signals from the receiver to produce a steering matrix for the forward channel, as the transmitter can use the signals from the receiver to determine the reverse channel, and can simply estimate the forward channel as a matrix transpose of the reverse channel. As a result, implicit beamforming reduces the amount of startup exchange signals that need to be sent between a transmitter and a receiver because the transmitter can estimate the forward channel based solely on signals sent from the receiver to the transmitter. Additionally, U.S. patent application Ser. No. 11/857,297, filed on Sep. 18, 2007, and entitled "Calibration Correction for Implicit Beamforming in a Wireless MIMO Communication System," which is hereby incorporated by reference herein, describes techniques for improving the performance of implicit beamforming by calculating and utilizing correction matrices that can applied to the signal to be transmitted via the forward channel or that can be applied to the steering matrix, for example.

SUMMARY

In one embodiment, a method includes causing a plurality of training signal sets to be transmitted, and receiving the plurality of training signal sets, wherein each received training signal set includes information sufficient to determine a channel estimate corresponding to a communication channel from a first station to a second station. The method also includes determining a refined channel estimate based on the plurality of received training signal sets.

In another embodiment, a method includes receiving a plurality of training signal sets from a first station, wherein each received training signal set includes information sufficient to determine a channel estimate corresponding to a communication channel from the first station to a second station. Additionally, the method includes determining a refined channel estimate corresponding to the communication channel from the first station to the second station based on the plurality of received training signal sets.

In yet another embodiment, a method includes transmitting a plurality of training signal sets to a first station, wherein each training signal set includes information sufficient for determining a channel estimate corresponding to a communication channel from a second station to the first station. Also, the method includes receiving respective individual channel estimates from the first station in response to each of the plurality of training signal sets, and determining a refined channel estimate corresponding to the communication channel from the second station to the first station based on the plurality of individual channel estimates.

In still another embodiment, a wireless transceiver comprises a plurality of antennas, a pre-coding processor coupled to the plurality of antennas, and a modulation unit coupled to the pre-coding processor. The wireless transceiver also comprises a controller coupled to the modulation unit to cause a plurality of training signal sets to be transmitted, wherein each training signal set includes information sufficient to determine a channel estimate corresponding to a communication channel. The wireless transceiver additionally comprises a channel determination unit to generate a refined channel estimate based on channel state information determined based on transmission of the plurality of training signal sets.

In yet another embodiment, a first wireless transceiver comprises a plurality of antennas, a pre-coding processor coupled to the plurality of antennas, and a modulation unit coupled to the pre-coding processor. Additionally, the first wireless transceiver comprises a channel determination unit to generate a refined channel estimate based on a plurality of received training signal sets received from a second wireless transceiver, wherein each received training signal set includes information sufficient to determine a channel estimate corresponding to a communication channel from the second wireless transceiver to the first wireless transceiver.

In another embodiment, a first wireless transceiver comprises a plurality of antennas, a pre-coding processor coupled to the plurality of antennas, and a modulation unit coupled to the pre-coding processor. Also, the first wireless transceiver comprises a controller coupled to the modulation unit to cause a plurality of training signal sets to be transmitted from the first wireless transceiver to a second wireless transceiver, wherein each training signal set includes information sufficient to determine a channel estimate corresponding to a communication channel from the first wireless transceiver to a second wireless transceiver. The first wireless transceiver additionally comprises a channel determination unit to generate a refined channel estimate based on a plurality of respective individual channel estimates received from the second wireless transceiver in response to each of the plurality of training signal sets.

DETAILED DESCRIPTION

While some of the channel estimation techniques described herein for processing and effecting a wireless data transmission are described as being used in communication systems that use the IEEE Standard 802.11n communication standard, these techniques may be used in various other types of wireless communication systems and are not limited to those conforming to the IEEE Standard 802.11n standard. For example, the channel estimation techniques may be utilized in communication systems conforming to one of the other IEEE 802.11x standards, the IEEE 802.16 standards, Release 8 of the Third Generation Partnership Project (3GPP) specification, proprietary communication systems, etc. As other examples, the channel estimation techniques may be utilized in single input, multiple output (SIMO) and multiple input, single output (MISO) communication systems, in communication systems in which a modulation scheme other than OFDM is utilized, etc.

Figure 1:
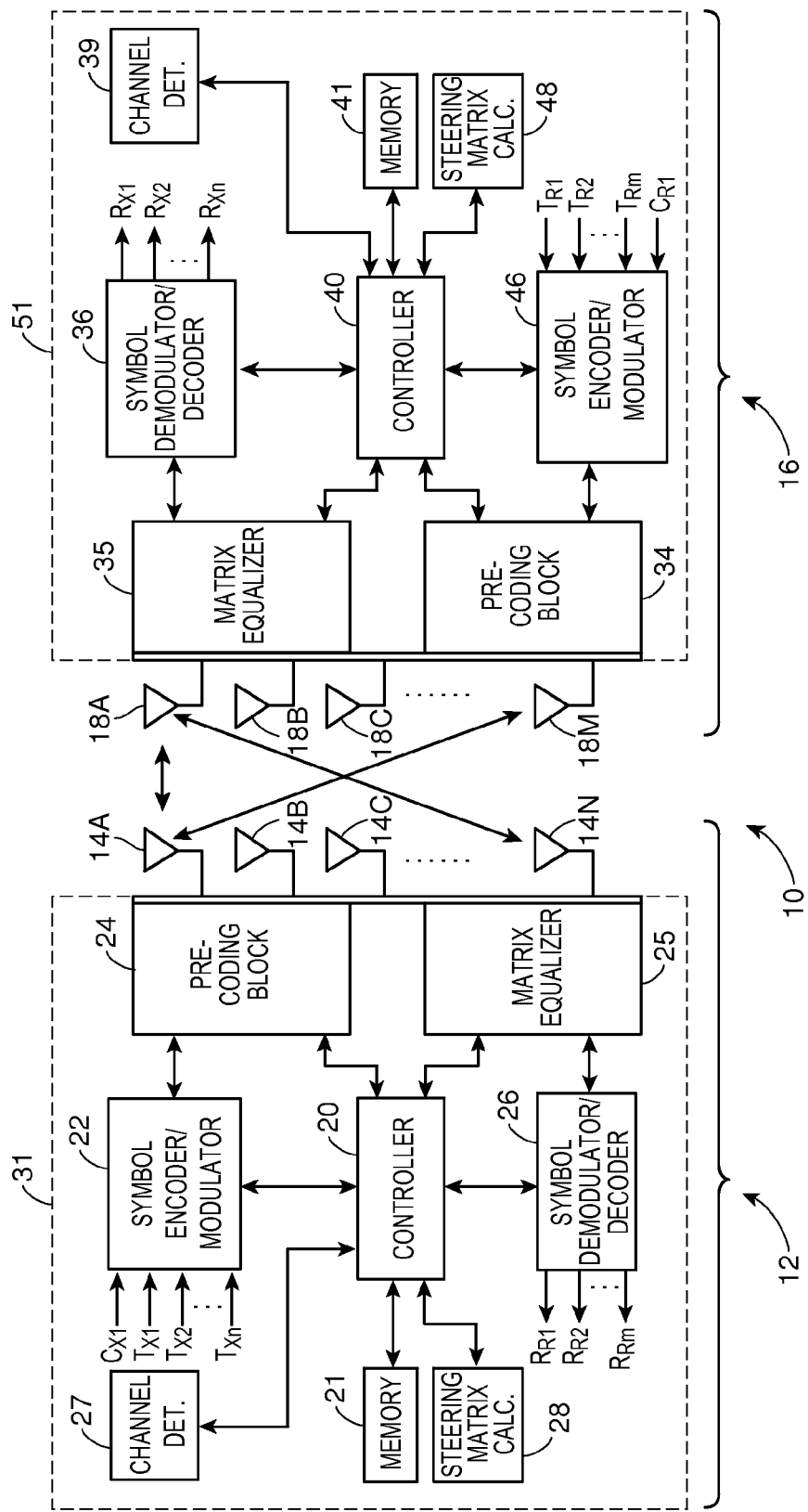
FIG. 1 is a block diagram of a wireless MIMO communication or transmission system that may implement channel estimation techniques such as described herein.

Referring now to FIG. 1, a MIMO communication system 10 is illustrated in block diagram form as generally including a single transceiver device 12 (hereinafter referred to as transmitter 12) having multiple transmit antennas 14A-14N and a single transceiver device 16 (hereinafter referred to as receiver 16) having multiple receiver antennas 18A-18M. The number of transmit antennas 14A-14N can be the same as, more than, or less than the number of receiver antennas 18A-18M. As shown in FIG. 1, the transmitter 12 may include a controller 20 coupled to a memory 21, a symbol encoder and modulator unit 22 and a space-time filtering or mapping block 24, also referred to herein as a transmit beamforming network. The transmitter 12 may also include a matrix equalizer 25 and a symbol demodulator and decoder unit 26 to perform demodulation and decoding of signals received via the antennas 14A-14N in a receive mode. Additionally, the transmitter 12 includes a channel determination unit 27 and a steering matrix calculation unit 28. The controller 12 may be any desired type of controller, and the controller 12, the channel determination unit 27 and the steering matrix calculation unit 28 may be implemented as one or more standard multi-purpose, programmable processors, such as micro-processors, as application specific integrated circuits (ASICs), etc., or may be implemented using any other desired types of hardware, software and/or firmware. Likewise, the pre-coding block 24 or beamforming network, and the matrix equalizer 25 may be implemented using known or standard hardware and/or software elements. If desired, various of the transmitter components, such as the controller 20, the modulator unit 22, the demodulator unit 26, the channel determination unit 27, the steering matrix calculation unit 28, the precoding block 24 and the matrix equalizer 25 may be implemented in the same or in different hardware devices, such as in the same or different processors. Additionally, each of these components of the transmitter 12 may be disposed in a housing 29 (shown in dotted relief in FIG. 1). Still further, the routines or instructions for implementing the functionality of any of these components may be stored in the memory 21 or within other memory devices associated with the individual hardware used to implement these components.

During operation, information signals $T_{x1}$-$T_{xn}$ which are to be transmitted from the transmitter 12 to the receiver 16 are provided to the symbol encoder and modulator unit 22 for encoding and modulation. Of course, any desired number of signals $T_{x1}$-$T_{xn}$ may be provided to the modulator unit 22, with this number generally being limited by the modulation scheme used by and the bandwidth associated with the MIMO communication system 10. Additionally, the signals $T_{x1}$-$T_{xn}$ may be any type of signals, including analog or digital signals, and may represent any desired type of data or information. Additionally, if explicit channel estimation is utilized, a known training signal $C_{x1}$ (which may be stored in the memory 21) may be provided to the symbol encoder and modulator unit 22 for use in determining CSI related information describing the characteristics of the channel from the transmitter 12 to the receiver 16. The same training signal or a different training signal may be used to determine the CSI for each frequency and/or spatial channel used in the MIMO communication system 10. Thus, a set of training signals may be transmitted from the transmitter 12 to the receiver 16 in order to determine the CSI for the forward channel from the transmitter 12 to the receiver 16, and the set of training signals may include information sufficient for determining the CSI for the forward channel. For a MIMO channel corresponding to m receive antennas and n transmit antennas, the CSI may be a full-dimensional description of the channel (i.e., providing an m-by-n description of the channel), or a partial-dimensional description of the channel (i.e., providing a p-by-q description of the channel, where p<m and/or q<n). The set of training signals may be included in a packet such as a sounding packet, a null data packet, etc.

The symbol encoder and modulator unit 22 may interleave digital representations of the various signals $T_{x1}$-$T_{xn}$ and $C_{x1}$ and may perform any other known type(s) of error-correction encoding on the signals $T_{x1}$-$T_{xn}$ and $C_{x1}$ to produce one or more streams of symbols to be modulated and sent from the transmitter 12 to the receiver 16. While the symbols may be modulated using any desired or suitable QAM technique, such as using 64 QAM, these symbols may be modulated in any other known or desired manner including, for example, using any other desired phase and/or frequency modulation techniques. In any event, the modulated symbol streams are provided by the symbol encoder and modulator unit 22 to the pre-coding block 24 for processing before being transmitted via the antennas 14A-14N. While not specifically shown in FIG. 1, the modulated symbol streams may be up-converted to the RF carrier frequencies associated with an OFDM technique (in one or more stages) before being processed by the space-time mapping block 24 in accordance with a beamforming technique more specifically described herein. Upon receiving the modulated signals, the pre-coding block 24 or beamforming network processes the modulated signals by injecting delays and/or gains into the modulated signals based on a steering matrix provided by the controller 12, to thereby perform beamsteering or beamforming via the transmit antennas 14A-14N.

The signals transmitted by the transmitter 12 are received by the receiver antennas 18A-18M and may be processed by a matrix equalizer 35 within the receiver 16 to enhance the reception capabilities of the antennas 18A-18M. As will be understood, the processing applied at the receiver 16 (as well as at the transmitter 12) may be based on, for example, the CSI developed by the receiver 16 in response to the set of training signals transmitted by the transmitter 12. In particular, a controller 40 or other unit within the receiver 16, such as a channel determination unit 39, may process the received set of training signals and develop therefrom a measured description of the forward channel between the transmitter 12 and the receiver 16 by determining or characterizing the propagation effects of the forward channel on the set of training signals as it traveled through the forward channel. If explicit channel estimation is utilized, the CSI determined by the receiver 16 is transmitted back to the transmitter 12. The transmitter 12 may then utilize the CSI for the forward channel, determined by the receiver 14, for beamforming calculations, modulation coding set (MCS) selection, etc. In any event, a symbol demodulator and decoder unit 36, under control of the controller 40, may decode and demodulate the received symbol strings as processed by the matrix equalizer 35. In this process, these signals may be downconverted to baseband. Generally, the demodulator and decoder unit 36 may operate to remove effects of the forward channel based on the CSI as well as to perform demodulation on the received symbols to produce a digital bit stream. In some cases, if desired, the symbol demodulator and decoder unit 36 may perform error correction decoding and deinterleaving on the bit stream to produce the received signals $R_{x1}$-$R_{xn}$ corresponding to the originally transmitted signals $T_{x1}$-$T_{xn}$.

As shown in FIG. 1, the receiver 16 may also include a memory 41 and a symbol encoder and modulator unit 46 which may receive one or more signals $T_{R1}$-$T_{Rm}$ which may be encoded and modulated using any desired encoding and modulation techniques. The receiver 16 may also provide one or more known test or control signals $C_{R1}$ to the symbol encoder/modulator unit 46 to be sent to the transmitter 12 to enable the transmitter 12 to determine a measured description of the reverse channel from the receiver 16 to the transmitter 12. Similar to the training signals transmitted by the transmitter 12, a set of training signals may be transmitted from the receiver 16 to the transmitter 12 in order to determine the CSI for the reverse channel, and the set of training signals may include information sufficient for determining the CSI for the reverse channel. For a MIMO channel corresponding to m receive antennas and n transmit antennas, the CSI may be a full-dimensional description of the channel or a partial-dimensional description of the channel. The set of training signals may be included in a packet such as a sounding packet, a null data packet, etc.

The encoded and modulated symbol stream may then be upconverted and processed by a pre-coding block 34 to perform beamsteering based on a steering matrix developed by a steering matrix calculation unit 48, prior to being transmitted via the receiver antennas 18A-18N to, for example, the transmitter 12, thereby implementing the reverse link. As shown in FIG. 1, each of the receiver components may be disposed in a housing 51.

The matrix equalizer 25 and the demodulator/decoder unit 26 within the transmitter 12 operate similarly to the matrix equalizer 35 and the demodulator/decoder unit 36 of the receiver 16 to demodulate and decode the signals transmitted by the receiver 16 to produce the recovered signals $R_{R1}$-$R_{Rm}$. Here again, the matrix equalizer 25 may process the received signals in any known manner to enhance the separation and therefore the reception of the various signals transmitted by the antennas 18A-18M. Of course, the CSI or other measured description of the forward channel for the various OFDM channel(s) may be used by the steering matrix calculation units 28 and 48 as well as by the controllers 20 and 40 to perform beamforming and to determine a steering matrix used by the pre-coding blocks 24, 34. Additionally, the CSI or other measured description of the forward channel for the various OFDM channel(s) may be used by the controllers 20 and 40 and/or the modulators 22, 46 to perform MCS selection. As noted above, the CSI, beamforming and other programs and data such as the steering matrix used by the units 28 and 48 and by the controllers 20 and 40, a selected MCS, etc. may be stored in the memories 21 and 41.

If implicit channel estimation is utilized, the CSI for the forward channel may be developed by the transmitter 12 in response to a reception of the set of training signals sent by the receiver 16. In particular, the controller 20 or other unit within the transmitter 12, such as a channel determination unit 27, may process the set of training signals received from the receiver 16 and develop therefrom a measured description of the reverse channel from the receiver 16 to the transmitter 12 by determining or characterizing the propagation effects of the reverse channel on the set of training signals as it traveled through the reverse channel. Then, the CSI of the forward channel may be estimated based on the determined CSI for the reverse channel and/or the forward channel estimate can be estimated based on a reverse channel estimate. For example, a forward channel estimate matrix may be determined as the matrix transpose of a reverse channel matrix. Thus, in the ideal case, the transmitter only needs to receive signals from the receiver to produce a steering matrix for the forward channel, as the transmitter can use the signals from the receiver to determine the reverse channel, and can simply estimate the forward channel as a matrix transpose of the reverse channel. As a result, implicit beamforming reduces the amount of startup exchange signals that need to be sent between a transmitter and a receiver because the transmitter can estimate the forward channel based solely on signals sent from the receiver to the transmitter. Optionally, a correction matrix can be calculated that can applied to the signal to be transmitted via the forward channel or that can be applied to the steering matrix, for example, as described in U.S. patent application Ser. No. 11/857,297. Such correction matrices may improve the forward channel estimate and/or forward channel beamforming when implicit channel estimation is utilized. Similarly, the CSI for the reverse channel may be developed by the receiver 16 in response to a reception of the set of training signals sent by the transmitter 12. In particular, the controller 40 or other unit within the receiver 16, such as a channel determination unit 39, may process the set of training signals received from the transmitter 12 and develop therefrom a measured description of the forward channel from the transmitter 12 to the receiver 16 by determining or characterizing the propagation effects of the forward channel on the set of training signals as it traveled through the forward channel. Then, the CSI of the reverse channel may be estimated based on the determined CSI for the forward channel and/or the reverse channel estimate can be estimated based on a forward channel estimate.

As is generally known, beamforming or beamsteering typically includes applying appropriate phases and gains to the various signals as sent through the multiple transmit antennas 14A-14N, in a manner which causes the signals sent from the different transmit antennas 14A-14N to constructively interact (add in phase) in certain predetermined directions and to deconstructively interact (cancel) in other directions. Thus, beamsteering typically produces a beam pattern having high gain regions (referred to as high gain lobes) in various predetermined directions and low gain regions (typically referred to as nulls) in other directions. The use of beamforming techniques in a MIMO system enables a signal to be sent with high gain (as compared to an omni-directional antenna) in certain directions, and to be sent with low gain (as compared to an omni-directional antenna) in other directions. Thus, in the MIMO system 10 of FIG. 1, beamforming may be used to enhance signal directivity towards the receive antennas 18A-18M, which improves the SNR of the transmissions and results in more reliable transmissions. In this case, the beamforming technique will generally form high gain lobes in the direction of propagation at which the highest gain is desired, and in particular in the directions of propagation from the transmitter 12 to each of the receive antennas 18A-18M of the receiver 16 or to the receiver 16 in general.

To implement beamforming in the transmitter 12, the steering matrix calculation unit 28 may determine or calculate a set of matrix coefficients (referred to herein as a steering matrix) which are used by the space-time mapping block or beamforming network 24 to condition the signals being transmitted by the antennas 14A-14N. Generally speaking, the steering matrix for any particular frequency channel of the MIMO system 10 (in the forward channel between the transmitter 12 and the receiver 16) may be determined by the steering matrix calculation unit 28 based on the CSI determined for that forward channel. In this case, the steering matrix calculation unit 28 may use any desired beam steering or matrix computation techniques, such as transmit-MRC or SVD techniques, to compute the steering matrix. As these techniques are well known in the art, they will not be discussed in detail herein.

However, as is known, to actually determine the CSI or other measured description of the forward channel, i.e., for the channel from the transmitter 12 to the receiver 16, the transmitter 12 generally sends the set of training signals (e.g., including the signal $C_{x1}$) and the receiver 16 may then determine the CSI or other measured description of the forward channel and send this information back to the transmitter 12 as part of a payload of a transmission. In the event of explicit beamforming, in this case, the transmitter 12 must first send the set of training signals to the receiver 16 which then determines a measured description of the forward channel and sends this description of the forward channel from the receiver 16 back to the transmitter 12. This characterization of the forward channel thereby requires, each time the steering matrix is computed, multiple communications between the transmitter 12 and the receiver 16 so as to enable the transmitter 12 to obtain the CSI or other description of the forward channel used to develop the steering matrix to be used in the forward channel. In the case of implicit beamforming, to avoid the use of multiple communication between a particular transmitter/receiver pair each time a steering matrix is to be computed for the forward channel, the transmitter 12 may determine the CSI or other measured description of the reverse channel, i.e., the channel from the receiver 16 to the transmitter 12, from the set of training signals sent from the receiver 16 including, for example the known test or control signal $C_{R1}$. Based on the CSI or other measured description of the reverse channel, the transmitter 12 may calculate the steering matrix for the forward channel.

To reduce or account for the errors introduced by RF chain impairments in a standard implicit beamforming technique, the transmitter 12 optionally may use a calibration technique that applies a correction matrix during the beamforming process to compensate for measured differences between the actual forward and reverse channels. This technique is described in U.S. patent application Ser. No. 11/857,297. In particular, this technique first determines a correction matrix as a function of measured descriptions of the forward and the reverse channels. Then, each time a new steering matrix is to be calculated for the forward channel, the beamforming technique applies the correction matrix to a steering matrix determined using a basic implicit beamforming technique, so that, once the correction matrix is determined, the transmitter may simply perform implicit beamforming using a measured description of the reverse channel (i.e., the channel between the receiver and the transmitter) to produce an estimate of the forward channel (i.e., the channel between the transmitter and the receiver). Alternatively, the transmitter 12 may also calculate correction matrices for its receive chains, so that once the correction matrix is determined, the transmitter may apply it to the reverse channel (i.e., the channel from the receiver 16 to the transmitter 12) estimation, and perform implicit beamforming using a measured description of this processed reverse channel estimate to produce an estimate of the forward channel (i.e., the channel from the transmitter 12 to the receiver 16). The calibration procedure may be conducted infrequently, compared with steering matrix updates. For example, it may be conducted only upon association of the device into the network, or upon the changes in the environment (e.g. a change in temperature).

As the SNR of the channel decreases (such as when the distance between the transmitter 12 and the receiver 16 increases), the determined CSI may provide a less accurate characterization of the channel, leading to less accurate channel estimates. Because the steering matrix (and other transmitter functions such as MCS selection) is determined based on the channel estimate, the determined steering matrix (or MCS selection) may be flawed or sub-optimal if a low SNR resulted in a poor channel estimate. Channel estimate techniques are described subsequently that enable the calculation of more accurate channel estimates when SNR is low, such as when the distance between the transmitter 12 and the receiver 16 is high relative to the transmit power of the transmitter 12.

Figure 2:
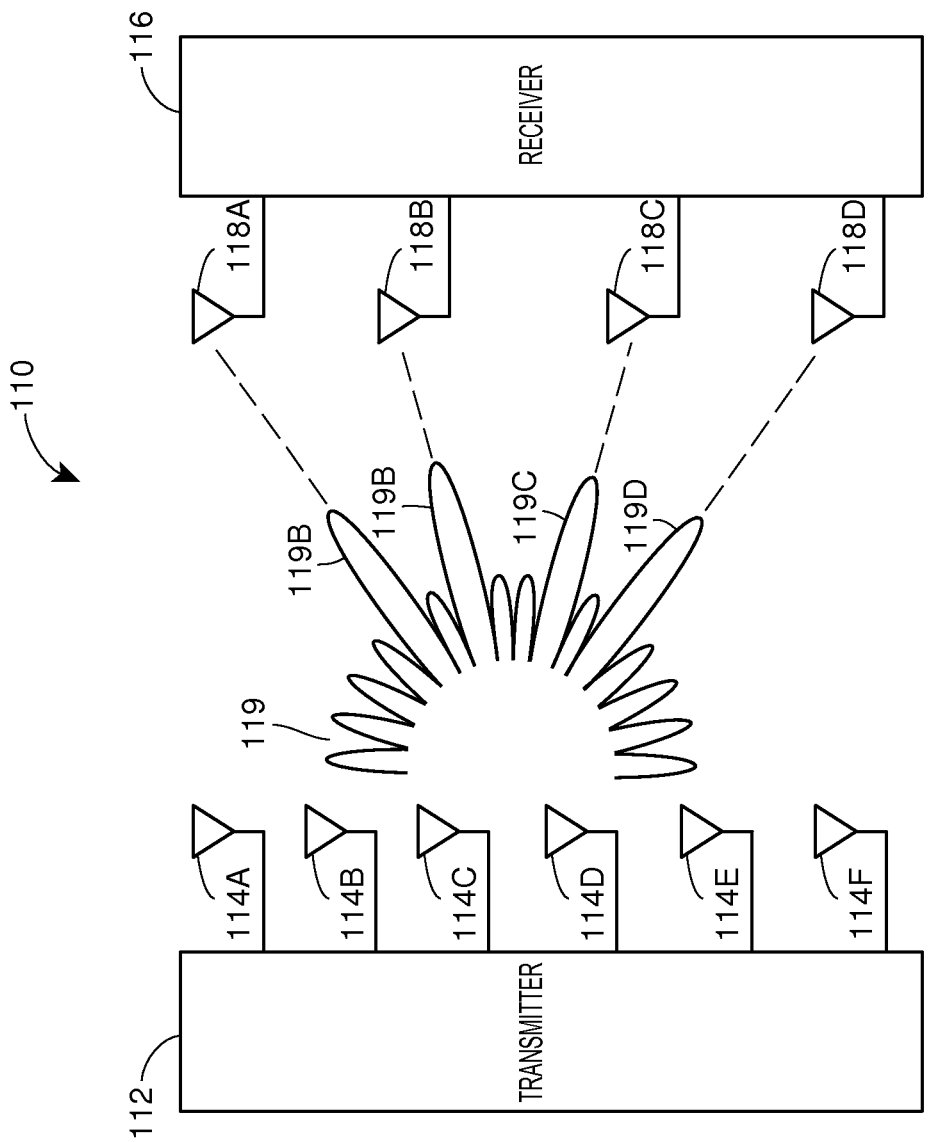
FIG. 2 is a block diagram illustrating a transmit gain pattern for wireless communications between a single transmitter and a single receiver.

To illustrate beamforming scenarios with which the channel estimate techniques described below can be utilized, FIG. 2 shows a MIMO communication system 110 having a single transmitter 112 with six transmitter antennas 114A-114F, and a single receiver 116 with four receiver antennas 118A-118D. In this example, the steering matrix may be developed by the transmitter 112 using feedback indicative of the CSI to create a transmit gain pattern 119 as shown disposed next to the transmitter 112. As illustrated in FIG. 2, the transmit gain pattern 119 includes multiple high gain lobes 119A-119D disposed in the directions of the receiver antennas 118A-118D. The high gain lobes 119A-119D are orientated in the directions of propagation from the transmitter 112 to the particular receiver antennas 118A-118D while lower gain regions, which may even include one or more nulls, are produced in other directions of propagation. While FIG. 2 illustrates a separate high gain lobe directed to each of the receiver antennas 118A-118D, it will be understood that the actual gain pattern produced by the beam steering matrix calculations using information pertaining to the matrix equalizer of the receiver 116 may not necessarily include a separate high gain lobe for each of the receiver antennas 118A-118D. Instead, the gain pattern developed by the beam steering matrix for the transmitter 112 may have a single high gain lobe covering or directed generally to more than one of the receiver antennas 118A-118D. Thus, it is to be understood that the beam pattern resulting from the creation of a steering matrix may or may not have separate high gain lobes separated by low gain regions or nulls for each of the receiver antennas.

Of course, developing the beam pattern 119 to have high gain regions and low gain regions may be performed in any desired manner and location. For example, any of the components within the receiver 16 of FIG. 1, including the controller 40 and the steering matrix calculation unit 48 optionally may process steering information and may then send this information to the transmitter 12. In this case, the controller 20 or the steering matrix calculation unit 28 within the transmitter 12 may use the steering information to determine the steering matrix for use in the precoding block 24 for performing beamforming to the receiver 16. On the other hand, the controller 40 or the steering matrix calculation unit 48 within the receiver 16 may use the steering information to determine the steering matrix for use in the precoding block 24 of the transmitter 12, and may then transmit this steering matrix to the transmitter 12.

The receiver 116 may compute the steering matrix to be used by the transmitter 112 based on the CSI developed by the receiver 116, and may send the actual steering matrix to the transmitter 112 to be used in transmitting information to the receiver 16. On the other hand, the steering matrix for the transmitter precoding block 24 of FIG. 1 may be calculated by the steering matrix calculation unit 28 within the transmitter 12 based on the CSI provided and sent back from the receiver 16 to the transmitter 12. With implicit beamforming, the steering matrix for the transmitter precoding block 24 of FIG. 1 may be calculated by the steering matrix calculation unit 28 within the transmitter 12 based on CSI for the reverse channel.

Figure 3:
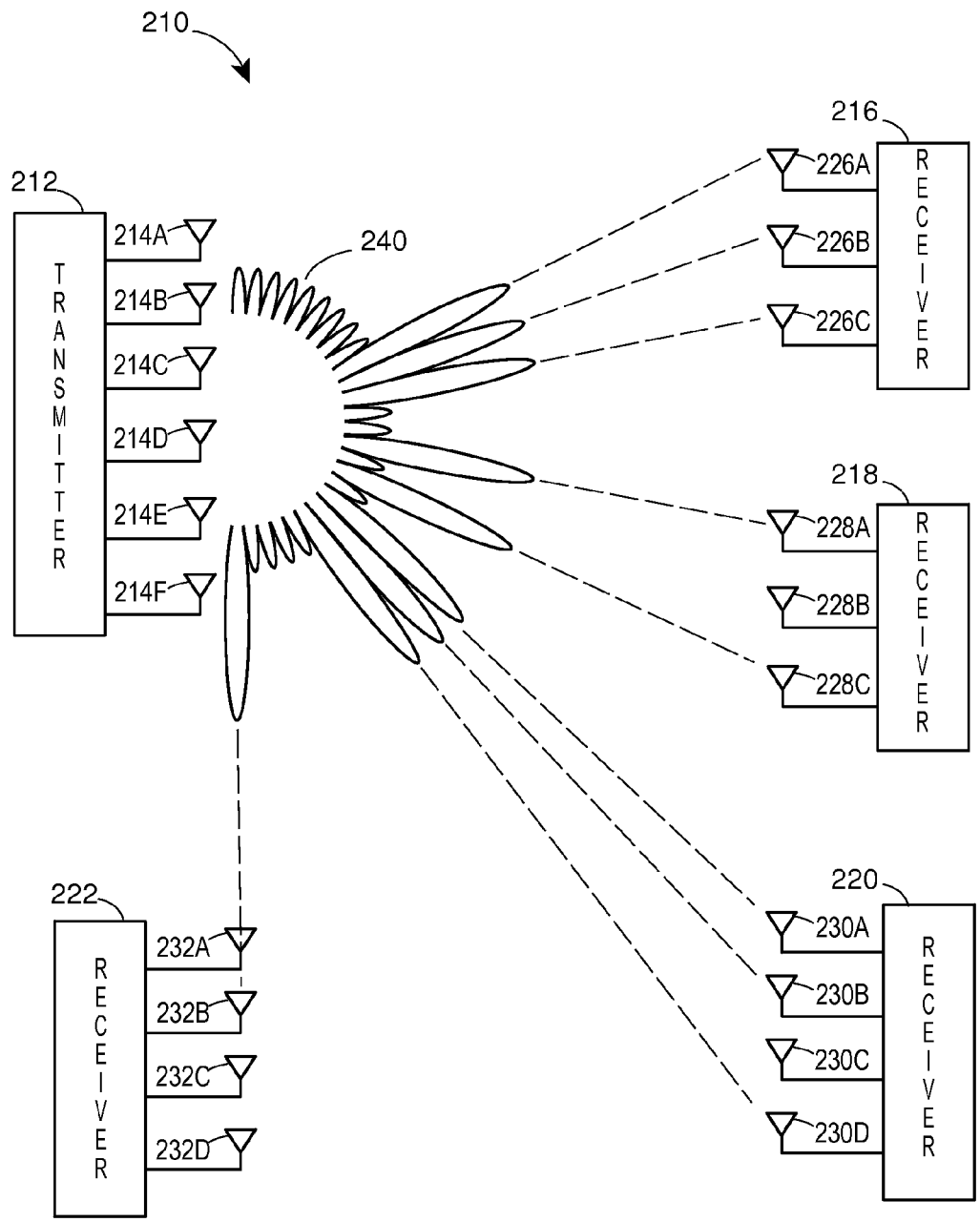
FIG. 3 is a block diagram illustrating a transmit gain pattern for wireless communications between a single transmitter and multiple receivers.

Of course, the channel estimate techniques described herein are not limited to being used with a transmitter of a MIMO communication system communicating with a single receiver of the MIMO communication system, but can additionally be applied when a transmitter of a MIMO communication system is communicating with multiple receivers, each of which has one or more receiver antennas associated therewith. For example, FIG. 3 illustrates a MIMO system 210 in which a single transmitter 212 having multiple (in this example six) transmitter antennas 214A-214F transmits to multiple receivers 216, 218, 220 and 222, each having multiple receiver antennas 226A-226C, 228A-228C, 230A-230D, and 232A-232D, respectively. While shown in this example as including three or four receiver antenna, any or all of the receivers 216, 218, 220, 222 of FIG. 3 could include different numbers of receiver antennas, including only a single receiver antenna if so desired. In any event, as illustrated by the transmit gain pattern 240 illustrated in FIG. 3, the steering matrix calculated and used by the transmitter 212 is formed using steering information and/or CSI generated by one or more of the transmitter 212 and/or the receivers 216, 218, 220 and 222.

In one example, the transmitter steering matrix may be calculated or determined using steering information or CSI generated by each of the receivers 216, 218, 220 and 222, so that, as shown by the transmit gain pattern 240, a high gain lobe is directed to at least one receiver antenna of each of the receivers 216, 218, 220, 222 at the same time. However, the steering matrix need not necessarily produce a high gain lobe directed to all of the receiver antennas of each of the receivers 216, 218, 220, 222, and not necessarily to all of the receiver antennas for any particular one of the receivers 216, 218, 220, 222. Thus, as illustrated in FIG. 3, the steering matrix for the transmitter 212 is determined in such a manner that a separate high gain lobe is directed to each of the receiver antennas 226A, 226B, 226C, 228A, 228C, 230A, 230B and 230D. However, due to the physical location of the receiver 222 and its antennas with respect to the transmitter 212, a single high gain lobe is directed to the receiver antennas 232A-232D, resulting in a single high gain lobe in the transmit gain pattern 240 directed to all of these receiver antennas On the other hand, the transmitter 212 may develop a different steering matrix for each of the receivers 216, 218, 220 and 222 using steering information and/or CSI generated by each of these receivers, and may use those steering matrixes to beamform to the separate or different receivers at different times or using different channels, e.g., OFDM channels, of the system.

While, in many cases, it will be desirable to beamform in such a way to direct a high gain lobe to at least one receiver antenna from each receiver, it may not be necessary to implement this requirement in all cases. For example, a particular receiver may be in a direct line of sight from the transmitter to another receiver and therefore may be disposed in a high gain region of the transmitter and may thus adequately receive the transmitted signals from the transmitter without utilizing steering information or CSI generated by that receiver. As another example, a particular receiver may be disposed in a low gain region associated with the transmitter, but may be disposed relatively close to the transmitter so that the particular receiver adequately receives the signals transmitted by the transmitter without utilizing steering information generated by that receiver. Of course, if desired, the number and location (identity) of the receivers used in calculating the transmitter steering matrix can be determined in any manner, including by trial and error, in determining an acceptable or optimal steering matrix using steering information generated by more than one receiver. Still further, while the maximum gains of the high gain lobes of each of the transmit gain patterns shown in FIGS. 2 and 3 are shown as being the same, the steering matrix calculation units 28 and 48 may develop steering matrixes which produce high gain lobes with differing maximum gains.

If implicit beamforming is utilized, the transmitter 212 may develop steering matrices based on CSI associated with the multiple reverse channels between the transmitter 212 and the multiple receivers 216, 218, 220 and 222.

Figure 4:
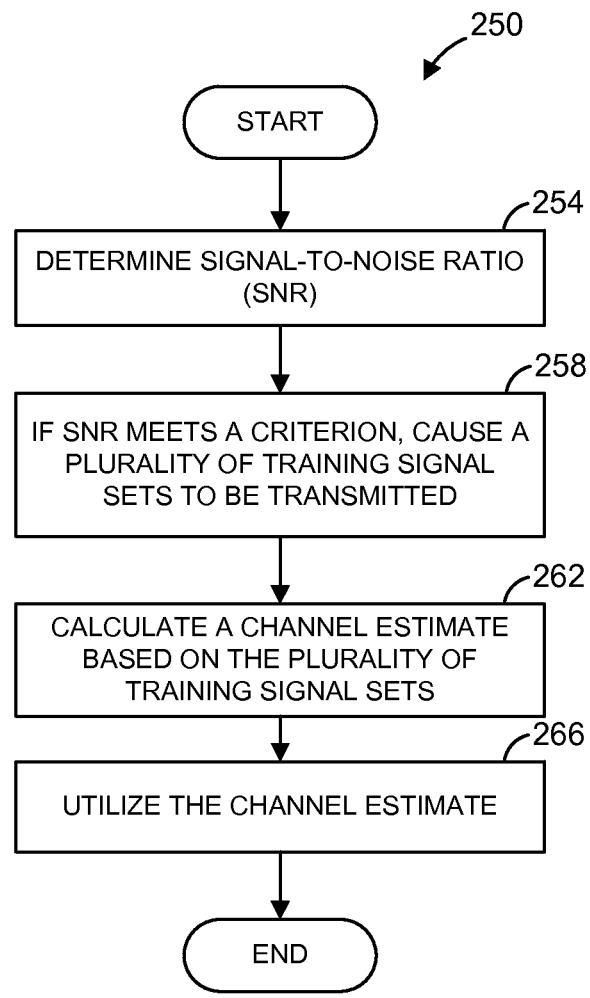
FIG. 4 is a flow diagram of an example channel estimation method.

FIG. 4 is a block diagram of an example method 250 for generating a channel estimate. The channel estimate may be utilized for various transmitter processing functions such as calculating a steering matrix, MCS selection, etc. The method 250 will be described with reference to FIG. 1 for explanatory purposes. It will be understood, however, that the method 250 may be utilized with systems other than the system 10 of FIG. 1.

At block 254, a signal-to-noise ratio (SNR) of a channel may be determined. The SNR of the channel may be determined in a variety of ways, including using currently known techniques. For example, the SNR for a channel may be determined based on, or included in, the CSI for the channel. As discussed above, the CSI for a channel may be determined based on transmitting a training signal set and receiving the training signal set. Thus, for explicit beamforming and/or explicit channel estimation corresponding to a forward channel, the transmitter may transmit the training signal set to the receiver 16. Then, the CSI for the forward channel may be determined by the receiver 16, and the receiver 16 may transmit the CSI back to the transmitter 12. The transmitter 12 may then determine the SNR based on the CSI. Optionally, if the SNR is not already included in the CSI, the SNR for the forward channel may be determined by the receiver 16, and then the receiver 16 may transmit the determined SNR back to the transmitter 12. For implicit beamforming and/or implicit channel estimation corresponding to a forward channel, the CSI for the forward channel may be determined by the transmitter 12 based on CSI of the reverse channel. For example, the transmitter 12 may transmit a request to the receiver 16 requesting that the receiver 16 transmit a training signal set to the transmitter 12. Upon receiving the training signal set, the transmitter 12 may determine the CSI for the reverse channel, and then determine a forward channel estimate based on the CSI for the reverse channel. The SNR for the forward channel may be determined based on the forward channel estimate or the CSI for the reverse channel (e.g., it may be assumed that the SNR for the forward channel is the same as the SNR for the reverse channel). The training signal set, as discussed above, may include information sufficient for determining the CSI for the channel. For a MIMO channel corresponding to m receive antennas and n transmit antennas, the CSI may be a full-dimensional description of the channel (i.e., providing an m-by-n description of the channel), or a partial-dimensional description of the channel (i.e., providing a p-by-q description of the channel, where p<m and/or q<n). The training signal set may be included in a packet such as a sounding packet, a null data packet, etc. A request for a training signal set may be included in a packet.

At block 258, it may be determined if the SNR meets a criterion. For example, it may be determined if the SNR is less than a threshold, is less than or equal to a threshold, etc. Meeting the criterion may indicate that the CSI for the channel may be unreliable if determined conventionally. If the criterion is met, a plurality of training signal sets may be transmitted. Each training signal set in the plurality of training signal sets may include information sufficient for determining the CSI for the channel. For example, in the case of explicit beamforming and/or explicit channel estimation, the transmitter 12 may retransmit the same training signal set one or more additional times. In response to each transmitted training signal set, the receiver 16 may determine CSI and, optionally, calculate an individual channel estimate based on the CSI. In some implementations, an individual channel estimate may be set to CSI corresponding to one of the transmitted training signal sets. Then, the CSI or individual channel estimate may be transmitted back to the transmitter 12. Alternatively, the receiver 16 may generate a refined channel estimate, as will be described below, based on the CSI or individual channel estimates associated with the plurality of training signal sets. Then, the refined channel estimate (or a beamsteering matrix, for example, calculated based on the refined channel estimate) may be transmitted back to the transmitter 12. In the case of implicit beamforming and/or implicit channel estimation, the transmitter 12 may transmit one or more requests to the receiver 16 requesting that the receiver 16 transmit one or more additional training signal sets to the transmitter 12. A single request transmitted by the transmitter 12 may be a request to transmit a single training signal set or a request to transmit a plurality of training signal sets. Thus, requesting that a plurality of transmit signal sets be transmitted may include transmitting one or more packets, for example. In response to each request, the receiver 16 may transmit a single training signal set or a plurality of training sets, depending on the type of request. Upon receiving each training signal set, the transmitter 12 may determine CSI and calculate an individual channel estimate based on the CSI.

At block 262, a refined channel estimate may be calculated based on the plurality of training signal sets transmitted in connection with blocks 254 and 258. In one implementation, an individual channel estimate may be determined or calculated based on each transmitted training signal set. In this implementation, the refined channel estimate may be calculated based on the plurality of individual channel estimates. For example, the channel estimate may be calculated as a weighted combination of the individual channel estimates:

$$\hat{H}_{refined,p} = \sum_{j=1}^{p} w_{j,p} \hat{H}_j \qquad \text{(Equation 1)}$$

where $\hat{H}_{refined,p}$ is the channel estimate after receiving the p-th training signal set, where $\hat{H}_j$ is the j-th individual channel estimate corresponding to the j-th received training signal set, $w_{j,p}$ is a weight to be applied to the j-th individual channel estimate. As can be seen with reference to above example, in contrast to conventional methods in which each channel estimate is calculated based on CSI corresponding to only a single training signal set, a channel estimate is calculated based on CSI corresponding to a plurality of training signal sets.

The weights $w_{j,p}$ may be chosen according to any of a variety to suitable weighting strategies. For example, uniform weighting may be utilized, where all of the p weights $w_{j,p}$ are set to a same value, such as 1/p. This may be a suitable weighting strategy when the plurality of training signal sets are spaced relatively closely in time and the channel varies slowly in time. As another example, the most recent individual channel estimate may be weighted most heavily, and the weights may decrease (e.g., linearly) as the individual channel estimates become less recent. For instance, the weights may be set according to:

$$w_{j,p} = \frac{2j}{p(p+1)}$$ (Equation 2)

Such a weighting strategy may be suitable for situations in which the training signal sets are spaced less closely, relatively, in time and the channel varies more quickly in time. Many other weighting strategies may be used such as weights that vary non-linearly.

In one implementation, the refined channel estimate may be calculated only after all p training signal sets have been received or after the CSI for all p training signal sets have been received. For example, CSI corresponding to each training signal set may be determined and stored in a memory as each training signal set is received. Then, after the p-th training signal set is received, the p individual channel estimates may be calculated based on the CSI's stored in the memory. Optionally, each individual channel estimate may be determined as CSI corresponding to a respective one of the plurality of training signal sets. In this implementation, a separate step of calculating individual channel estimates is not needed as the individual channel estimates are merely the CSI. Next, the refined channel estimate may be calculated according to Equation 1, for example. Alternatively, the individual channel estimate corresponding to each training signal set may be determined or calculated and stored in a memory as each training signal set is received. Then, after the p-th training signal set is received, the refined channel estimate may be calculated according to Equation 1, for example.

In another implementation, the refined channel estimate may be iteratively calculated as each of the p training signal sets is received or as each of the CSI or individual channel estimates is received or determined. For example, as each training signal set is received, an individual channel estimate may be determined or calculated. Then, the individual channel estimate may be weighted and added to a sum of the previous weighted individual channel estimates.

As another example, the refined channel estimate may be calculated according to:

$$\hat{H}_{refined,p} = a\hat{H}_{refined,p-1} + b\hat{H}_p$$ (Equation 3)

where a and b are weights that may be selected using a variety of techniques. The iterative calculation of Equation 3 optionally may be stopped after p individual channel estimates have been processed.

At block 266, the refined channel estimate calculated at block 262 may be utilized. For example, a steering matrix may be calculated using the refined channel estimate. As another example, a modulation coding set (MCS) may be selected based on the refined channel estimate. As another example, the refined channel estimate may be utilized for determining an equalizer or for performing other processing at a transmitter or receiver.

In one example, the refined channel estimate may be utilized (e.g., for beamsteering calculation, MCS selection, equalizer calculation, etc.) only after the p-th training signal set has been received and the refined channel estimate has been determined based on all p individual channel estimates. In another implementation, the refined channel estimate may be utilized (e.g., for beamsteering calculation, MCS selection, equalizer calculation, etc.) before the p-th training signal set has been received. For example, if the refined channel estimate is determined iteratively as each individual channel estimate is available, one or more versions of the refined channel estimate may be utilized prior to processing all p individual channel estimates.

Optionally, a receiver may generate a refined channel estimate, as described above, for a forward channel and then transmit the refined channel estimate for the forward channel back to the transmitter.

To improve reliability of reception, a training signal set may be transmitted without accompanying data (e.g., data included in the same packet as the training signal set). For instance, the IEEE 802.11n Standard specifies a Null Data Packet (NDP) procedure. For devices to be utilized in IEEE 802.11n compliant systems, the NDP procedure may be utilized to transmit the plurality of training signal sets.

If the training signal set is transmitted with accompanying data, the accompanying data may be transmitted according to a most reliable (or lowest) modulation coding set in order to improve reliability of reception. Similarly, a CSI or individual channel estimate or refined channel estimate feedback signal (i.e., a signal providing the CSI or individual channel estimate determined based on a transmitted training signal set or a refined channel estimate determined based on a plurality of training signal sets) may be transmitted according to a most reliable (or lowest) modulation coding set in order to improve reliability of reception.

The IEEE 802.11n Standard specifies an antenna selection (ASEL) procedure that involves transmitting multiple sounding signals. For devices to be utilized in IEEE 802.11n compliant systems, the ASEL procedure may be exploited to transmit the plurality of training signal sets. Optionally, utilization of the ASEL procedure may be combined with the NDP procedure.

If the method 250 is implemented in the system 10 of FIG. 1, blocks 254 and 258 may be implemented, at least partially, by the controller 20 or the controller 40, for example. Block 258 may be implemented, at least partially, by the channel determination unit 27 or the channel determination unit 39, for example. Block 262 may be implemented, at least partially, by the steering matrix calculation unit 28, the steering matrix calculation unit 48, the controller 20 or the controller 40, the matrix equalizer 25, or the matrix equalizer 35, for example.

At least portions of the channel estimate techniques described herein may be implemented in software stored in, for example, one of the memories 21, 41 and implemented on a processor associated with one or both of the controllers 20, 40, the steering matrix calculation units 28, 48 and/or the channel determination units 27 and 39 of the MIMO communication system 10 of FIG. 1, or implanted in firmware as desired. If implemented in software, the routines may be stored in any computer readable memory such as in RAM, ROM, flash memory, a magnetic disk, a laser disk, or other storage medium. Likewise, this software may be delivered to a MIMO system device (such as a transmitter or a receiver) via any known or desired delivery method including, for example, over a communication channel such as a telephone line, the Internet, a wireless connection, etc., or via a transportable medium, such as a computer-readable disk, flash drive, etc.

More generally, the various blocks, operations, and techniques described above may be implemented in hardware, firmware, software, or any combination of hardware, firmware, and/or software. When implemented in hardware, some or all of the blocks, operations, techniques, etc. may be implemented in, for example, a custom integrated circuit (IC), an application specific integrated circuit (ASIC), a field programmable logic array (FPGA), a programmable logic array (PLA), etc.

When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a wireless communication channel, a wired telephone line, a DSL line, a cable television line, the Internet, etc. (which are viewed as being the same as or interchangeable with providing such software via a transportable storage medium).

The present invention may be embodied in any type of wireless communication system including, for example, ones used in wireless computer systems such as those implemented via a local area network or a wide area network, internet, cable and satellite based communication systems (such as internet, data, video and voice communication systems), wireless telephone systems (including cellular phone systems, voice over internet protocol (VoIP) systems, home-based wireless telephone systems, etc.) Referring now to FIGS. 5A-5F, various example devices that may embody the present invention are shown.

Figure 5A:
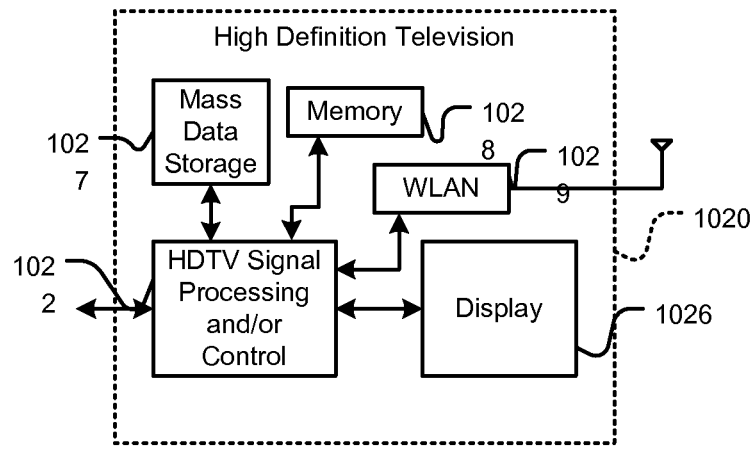
FIG. 5A is a block diagram of a high definition television that may utilize channel estimation techniques such as described herein.

Referring now to FIG. 5A, channel estimation techniques such as described above may be utilized in a high definition television (HDTV) 1020. HDTV 1020 includes a mass data storage 1027, an HDTV signal processing and control block 1022, a WLAN interface and memory 1028. HDTV 1020 receives HDTV input signals in either a wired or wireless format and generates HDTV output signals for a display 1026. In some implementations, signal processing circuit and/or control circuit 1022 and/or other circuits (not shown) of HDTV 1020 may process data, perform coding and/or encryption, perform calculations, format data and/or perform any other type of HDTV processing that may be required.

HDTV 1020 may communicate with a mass data storage 1027 that stores data in a nonvolatile manner such as optical and/or magnetic storage devices. The mass storage device may be a mini HDD that includes one or more platters having a diameter that is smaller than approximately 1.8". HDTV 1020 may be connected to memory 1028 such as RAM, ROM, low latency nonvolatile memory such as flash memory and/or other suitable electronic data storage. HDTV 1020 also may support connections with a WLAN via a WLAN network interface 1029. The WLAN network interface 1029 may implement channel estimation techniques such as described above.

Figure 5B:
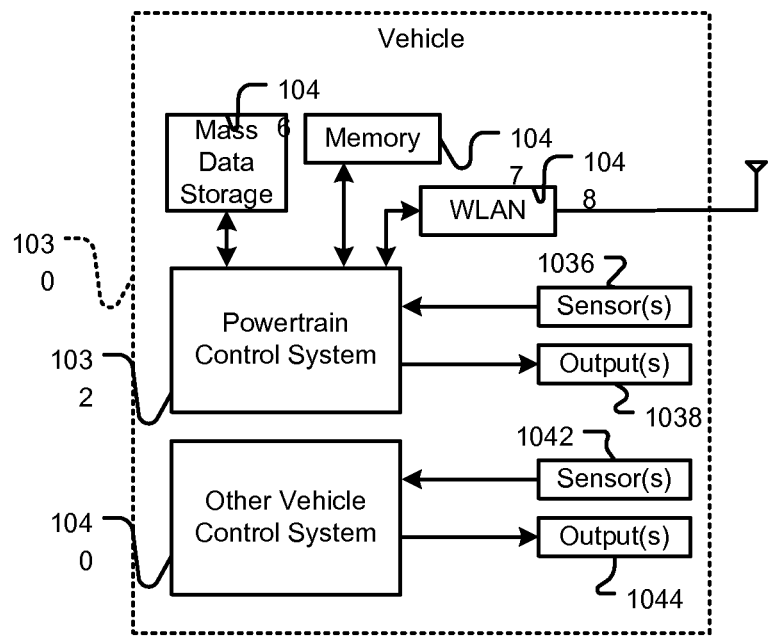
FIG. 5B is a block diagram of a vehicle that may utilize channel estimation techniques such as described herein.

Referring now to FIG. 5B, such techniques may be utilized in a vehicle 1030. The vehicle 1030 includes a control system that may include mass data storage 1046, as well as a WLAN interface 1048. The mass data storage 1046 may support a powertrain control system 1032 that receives inputs from one or more sensors 1036 such as temperature sensors, pressure sensors, rotational sensors, airflow sensors and/or any other suitable sensors and/or that generates one or more output control signals 1038 such as engine operating parameters, transmission operating parameters, and/or other control signals.

Control system 1040 may likewise receive signals from input sensors 1042 and/or output control signals to one or more output devices 1044. In some implementations, control system 1040 may be part of an anti-lock braking system (ABS), a navigation system, a telematics system, a vehicle telematics system, a lane departure system, an adaptive cruise control system, a vehicle entertainment system such as a stereo, DVD, compact disc and the like.

Powertrain control system 1032 may communicate with mass data storage 1027 that stores data in a nonvolatile manner such as optical and/or magnetic storage devices. The mass storage device 1046 may be a mini HDD that includes one or more platters having a diameter that is smaller than approximately 1.8". Powertrain control system 1032 may be connected to memory 1047 such as RAM, ROM, low latency nonvolatile memory such as flash memory and/or other suitable electronic data storage. Powertrain control system 1032 also may support connections with a WLAN via a WLAN network interface 1048. The control system 1040 may also include mass data storage, memory and/or a WLAN interface (all not shown). In one exemplary embodiment, the WLAN network interface 1048 may implement channel estimation techniques such as described above.

Figure 5C:
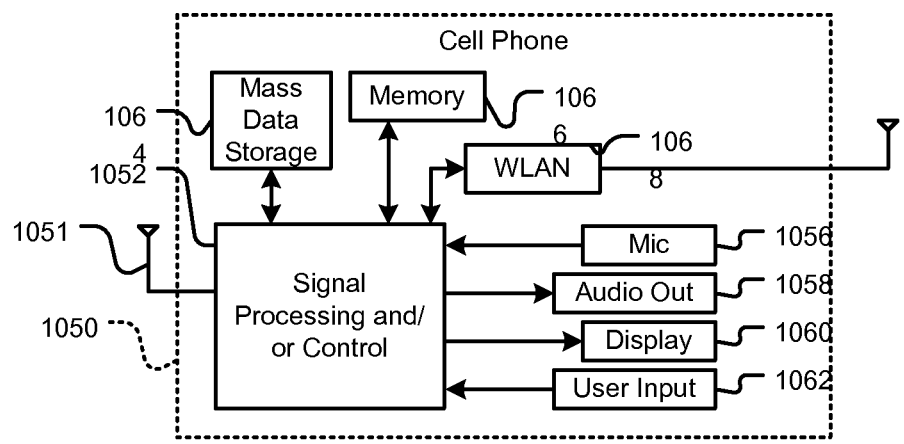
FIG. 5C is a block diagram of a cellular phone that may utilize channel estimation techniques such as described herein.

Referring now to FIG. 5C, such techniques may be used in a mobile phone 1050 that may include a cellular antenna 1051. The mobile phone 1050 may include either or both signal processing and/or control circuits, which are generally identified in FIG. 5C at 1052, a WLAN network interface 1068 and/or mass data storage 1064 of the cellular phone 1050. In some implementations, mobile phone 1050 includes a microphone 1056, an audio output 1058 such as a speaker and/or audio output jack, a display 1060 and/or an input device 1062 such as a keypad, pointing device, voice actuation and/or other input device. Signal processing and/or control circuits 1052 and/or other circuits (not shown) in cellular phone 1050 may process data, perform coding and/or encryption, perform calculations, format data and/or perform other mobile phone functions.

Mobile phone 1050 may communicate with mass data storage 1064 that stores data in a nonvolatile manner such as optical and/or magnetic storage devices for example hard disk drives HDD and/or DVDs. The HDD may be a mini HDD that includes one or more platters having a diameter that is smaller than approximately 1.8". Mobile phone 1050 may be connected to memory 1066 such as RAM, ROM, low latency nonvolatile memory such as flash memory and/or other suitable electronic data storage. Mobile phone 1050 also may support connections with a WLAN via a WLAN network interface 1068. The WLAN network interface 1068 may implement channel estimation techniques such as described above.

Figure 5D:
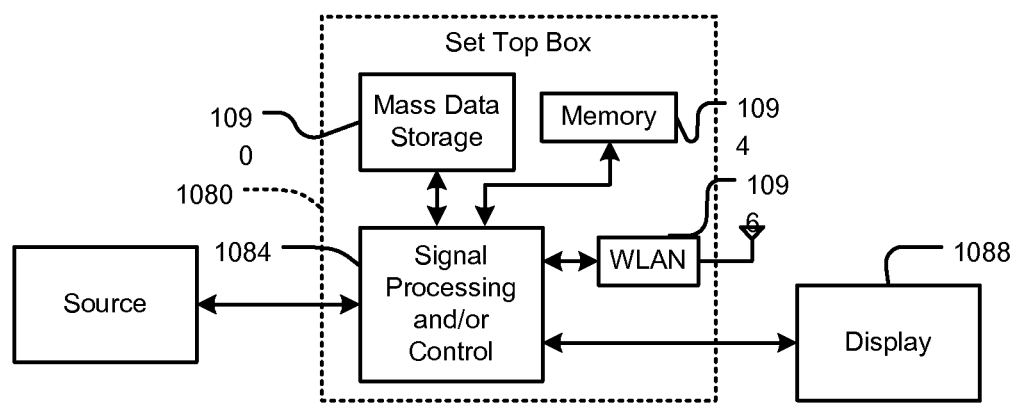
FIG. 5D is a block diagram of a set top box that may utilize channel estimation techniques such as described herein.

Referring now to FIG. 5D, such techniques may be utilized in a set top box 1080. The set top box 1080 may include either or both signal processing and/or control circuits, which are generally identified in FIG. 5D at 1084, a WLAN interface and/or mass data storage 1090 of the set top box 1080. Set top box 1080 receives signals from a source such as a broadband source and outputs standard and/or high definition audio/video signals suitable for a display 1088 such as a television and/or monitor and/or other video and/or audio output devices. Signal processing and/or control circuits 1084 and/or other circuits (not shown) of the set top box 1080 may process data, perform coding and/or encryption, perform calculations, format data and/or perform any other set top box function.

Set top box 1080 may communicate with mass data storage 1090 that stores data in a nonvolatile manner and may use jitter measurement. Mass data storage 1090 may include optical and/or magnetic storage devices for example hard disk drives HDD and/or DVDs. The HDD may be a mini HDD that includes one or more platters having a diameter that is smaller than approximately 1.8". Set top box 1080 may be connected to memory 1094 such as RAM, ROM, low latency nonvolatile memory such as flash memory and/or other suitable electronic data storage. Set top box 1080 also may support connections with a WLAN via a WLAN network interface 1096. The WLAN network interface 1096 may implement channel estimation techniques such as described above.

Figure 5E:
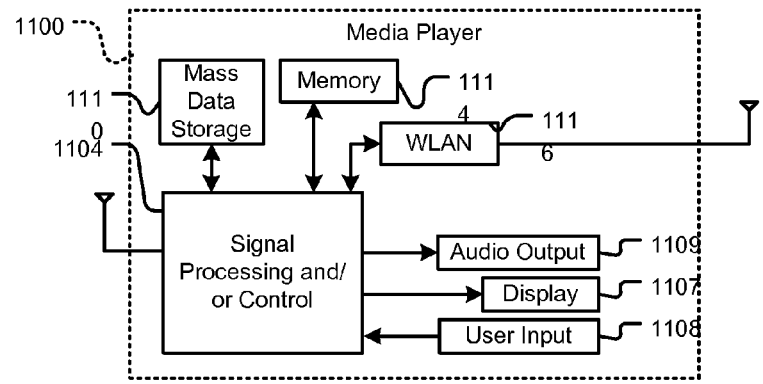
FIG. 5E is a block diagram of a media player that may utilize channel estimation techniques such as described herein.

Referring now to FIG. 5E, such techniques may be used in a media player 1100. The media player 1100 may include either or both signal processing and/or control circuits, which are generally identified in FIG. 5E at 1104, a WLAN interface and/or mass data storage 1110 of the media player 1100. In some implementations, media player 1100 includes a display 1107 and/or a user input 1108 such as a keypad, touchpad and the like. In some implementations, media player 1100 may employ a graphical user interface (GUI) that typically employs menus, drop down menus, icons and/or a point-and-click interface via display 1107 and/or user input 1108. Media player 1100 further includes an audio output 1109 such as a speaker and/or audio output jack. Signal processing and/or control circuits 1104 and/or other circuits (not shown) of media player 1100 may process data, perform coding and/or encryption, perform calculations, format data and/or perform any other media player function.

Media player 1100 may communicate with mass data storage 1110 that stores data such as compressed audio and/or video content in a nonvolatile manner and may utilize jitter measurement. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". Media player 1100 may be connected to memory 1114 such as RAM, ROM, low latency nonvolatile memory such as flash memory and/or other suitable electronic data storage. Media player 1100 also may support connections with a WLAN via a WLAN network interface 1116. The WLAN network interface 1116 may implement channel estimation techniques such as described above.

Figure 5F:
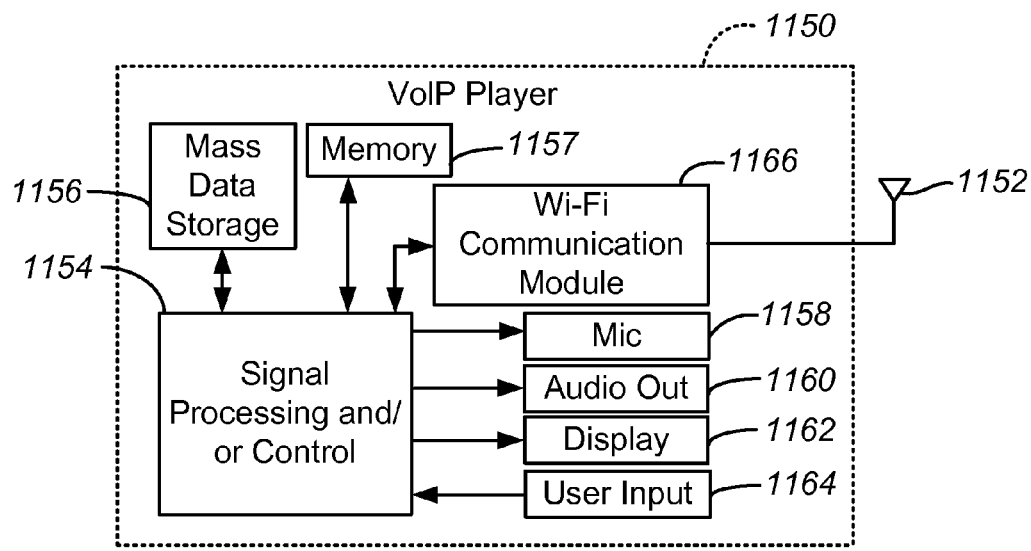
FIG. 5F is a block diagram of a voice over IP device that may utilize channel estimation techniques such as described herein.

Referring to FIG. 5F, such techniques may be utilized in a Voice over Internet Protocol (VoIP) phone 1150 that may include an antenna 1152. The VoIP phone 1150 may include either or both signal processing and/or control circuits, which are generally identified in FIG. 5F at 1154, a wireless interface and/or mass data storage of the VoIP phone 1150. In some implementations, VoIP phone 1150 includes, in part, a microphone 1158, an audio output 1160 such as a speaker and/or audio output jack, a display monitor 1162, an input device 1164 such as a keypad, pointing device, voice actuation and/or other input devices, and a Wireless Fidelity (WiFi) communication module 1166. Signal processing and/or control circuits 1154 and/or other circuits (not shown) in VoIP phone 1150 may process data, perform coding and/or encryption, perform calculations, format data and/or perform other VoIP phone functions.

VoIP phone 1150 may communicate with mass data storage 1156 that stores data in a nonvolatile manner such as optical and/or magnetic storage devices, for example hard disk drives HDD and/or DVDs. The HDD may be a mini HDD that includes one or more platters having a diameter that is smaller than approximately 1.8". VoIP phone 1150 may be connected to memory 1157, which may be a RAM, ROM, low latency nonvolatile memory such as flash memory and/or other suitable electronic data storage. VoIP phone 1150 is configured to establish communications link with a VoIP network (not shown) via WiFi communication module 1166. The WiFi communication module 1166 may implement channel estimation techniques such as described above.

Moreover, while the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. An apparatus comprising:
a hardware device configured to
generate a plurality of individual channel estimates based on a plurality of received training signal sets received from a first wireless transceiver, wherein each received training signal set includes information sufficient to determine a channel estimate corresponding to a first communication channel from the first wireless transceiver to a second wireless transceiver, and
determine a refined channel estimate based on a mathematical combination of the plurality of individual channel estimates.

2. An apparatus according to claim 1, wherein the refined channel estimate is an estimate of a second communication channel from the second wireless transceiver to the first wireless transceiver, and wherein the hardware device is configured to:
determine, based on the plurality of received training signal sets, an intermediate refined channel estimate of the first communication channel; and
determine the estimate of the second communication channel based on the intermediate refined channel estimate.

3. An apparatus according to claim 1, wherein the hardware device is configured to determine the refined channel estimate based on a weighted combination of the plurality of individual channel estimates.

4. An apparatus according to claim 3, wherein the hardware device is configured to weight the plurality of individual channel estimates with a plurality of different weights.

5. An apparatus according to claim 1, wherein the hardware device is configured to determine the refined channel estimate iteratively after each received training signal set is received.

6. An apparatus according to claim 5, wherein the hardware device is configured to utilize, after each training signal set is received, the iteratively determined refined channel estimate to process a wireless communication signal.

7. An apparatus according to claim 1, wherein the hardware device is configured to utilize, only after the plurality of received training signal sets has been received, the refined channel estimate to process a wireless communication signal.

8. An apparatus according to claim 1, wherein the hardware device is configured to cause a packet to be transmitted to the first wireless transceiver, wherein the packet includes a request to transmit the plurality of training signal sets.

9. An apparatus according to claim 1, wherein the hardware device is configured to cause a plurality of packets to be transmitted to the first wireless transceiver, wherein each packet in the plurality of packets includes a request to transmit a respective one of the plurality of training signal sets.

10. An apparatus according to claim 1, wherein the hardware device is configured to cause the refined channel estimate to be transmitted to the first wireless transceiver.

11. An apparatus according to claim 1, wherein the hardware device is configured to utilize the refined channel estimate to perform at least one of (i) beamsteering or (ii) selecting a modulation and coding scheme for transmitting a signal.

12. An apparatus according to claim 11, wherein the hardware device is configured to utilize the refined channel estimate to perform equalization of a received signal.

13. An apparatus comprising:
a hardware device configured to
cause a plurality of training signal sets to be transmitted from a first wireless transceiver to a second wireless transceiver, wherein each training signal set includes information sufficient to determine a channel estimate corresponding to a communication channel from the first wireless transceiver to the second wireless transceiver; and
generate a refined channel estimate based on a mathematical combination of a plurality of respective individual channel estimates received from the second wireless transceiver in response to each of the plurality of training signal sets.

14. An apparatus according to claim 13, wherein the hardware device is configured to determine the refined channel estimate based on a weighted combination of the plurality of individual channel estimates.

15. An apparatus according to claim 14, wherein the hardware device is configured to weight the plurality of individual channel estimates with a plurality of different weights.

16. An apparatus according to claim 13, wherein the hardware device is configured to determine the refined channel estimate iteratively after each individual channel estimate is received.

17. An apparatus according to claim 16, wherein the hardware device is configured to utilize, after each individual channel estimate is received, the iteratively determined refined channel estimate to process a wireless communication signal.

18. An apparatus according to claim 13, wherein the hardware device is configured to utilize, only after the plurality of individual channel estimates has been received, the refined channel estimate to process a wireless communication signal.

19. An apparatus according to claim 13, wherein the hardware device is configured to
determine a signal-to-noise ratio (SNR) associated with the communication channel, and
cause the plurality of training signal sets to be transmitted only if it is determined that the SNR meets a criterion.

20. An apparatus according to claim 13, wherein the hardware device is configured to utilize the refined channel estimate to perform at least one of (i) beamsteering or (ii) selecting a modulation and coding scheme for transmitting a signal.

* * * * *